Figure 1:
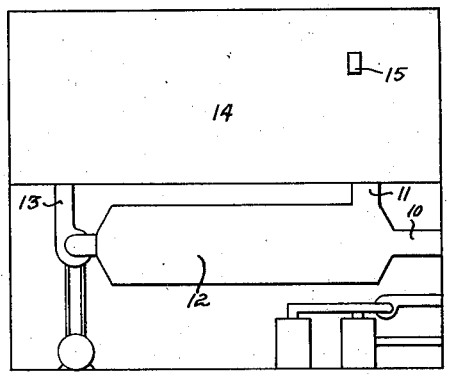

April 19, 1938.  H. F. SMITH  2,114,787

AIR DEHUMIDIFICATION

Filed April 20, 1934

Inventor
Harry F. Smith
By
Attorneys

Patented Apr. 19, 1938

2,114,787

UNITED STATES PATENT OFFICE 2,114,787

AIR DEHUMIDIFICATION

Harry F. Smith, Dayton, Ohio, assignor to General Motors Corporation, Dayton, Ohio, a corporation of Delaware Application April 20, 1934, Serial No. 721,487

1 Claims. (Cl. 62—171)

This invention relates to a method and apparatus of conditioning air.

An object of this invention is to provide a method and apparatus for conditioning air in an enclosure by dehumidifying the air and thereby imparting thereto a wet bulb temperature lower than outside atmospheric wet bulb temperature and utilizing, for the conditioning operations, agents and instrumentalities no lower in temperature than the wet bulb temperature of the outside atmosphere.

Further objects and advantages of the present invention will be apparent from the following description, reference being had to the accompanying drawing, wherein a preferred form of the present invention is clearly shown.

Figure 2:
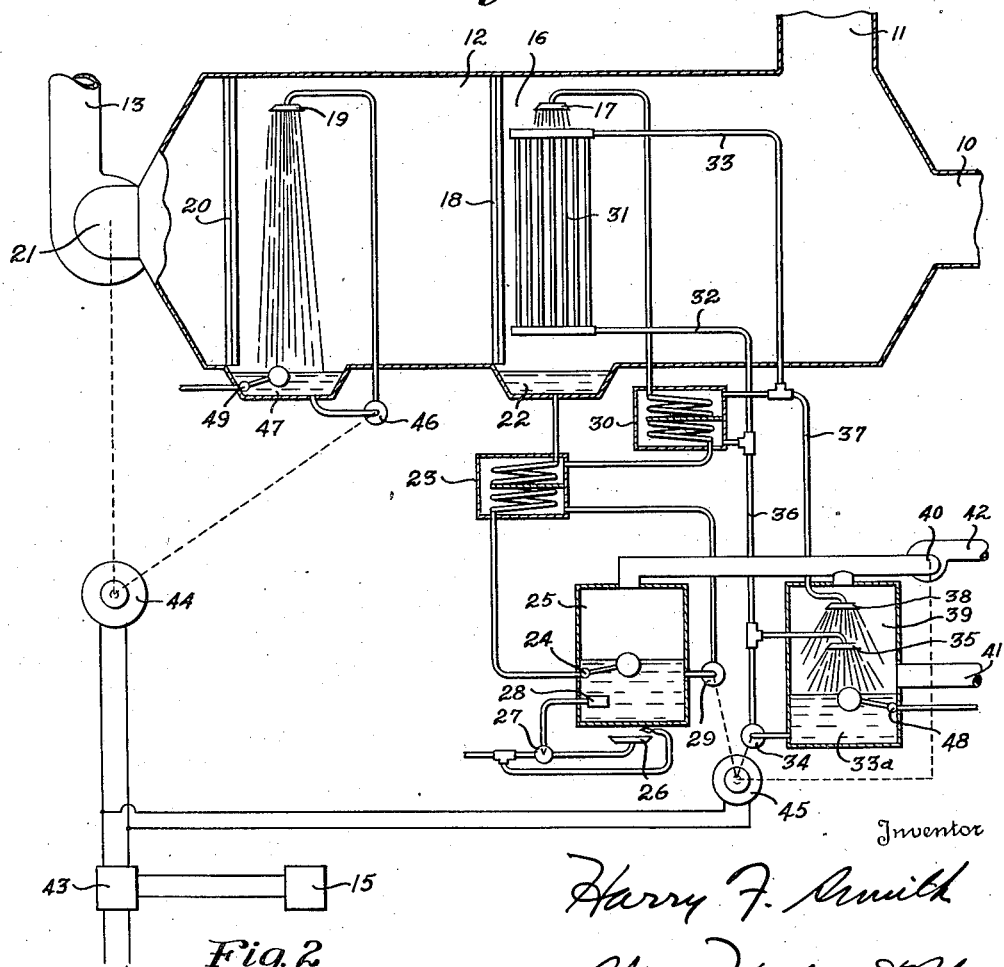

In the drawing:

Fig. 1 is a diagrammatic representation of an embodiment of my invention applied to a room or dwelling; and Fig. 2 is an enlarged diagrammatic representation of the air conditioning apparatus shown in Fig. 1.

In practicing my invention, air for an enclosure, room, dwelling or the like is dehydrated by contact with a hygroscopic medium maintained substantially at the wet bulb temperature of the outside atmosphere. This imparts to the air a new and lower wet bulb temperature before it is delivered to the enclosure. The hygroscopic medium is also maintained at a substantially constant concentration sufficient to remove a considerable quantity of moisture from the air, and thus a comfortable condition is imparted to the air by means of agents and instrumentalities none of which are lower in temperature than the wet bulb temperatures of the outside atmosphere.

In the preferred embodiment of my invention air for the enclosure is taken either from the atmosphere, as at 10, or from the enclosure itself, as at 11, and is passed through a conditioning zone 12 from whence it is delivered, through a duct 13, to the enclosure 14. An automatic device 15, which may be either a dry bulb thermostat, a wet bulb thermostat, or a psychometer is connected to control the conditioning of the air to maintain the desired air conditions in the enclosure 14.

As shown in Fig. 2, the zone 12 includes the contacting zone 16 where the air is brought in contact with a hygroscopic medium discharged through the spray head 17. The air then passes through eliminator 18. The air now has imparted thereto a new and lower wet bulb temperature and comes in contact with water, sprayed from the spray head 19. The water is maintained at the new and lower wet bulb temperature in a manner more fully to be described. From thence the air passes through eliminators 20 and is forced by the fan 21 through the duct 13 into the enclosure 14.

The hygroscopic medium is automatically concentrated and has automatically imparted thereto substantially the wet bulb temperature of the outside atmosphere. This is accomplished by draining the spent hygroscopic liquid into a sump 22 from whence it flows through a heat interchanger 23, through the float controlled valve 24, into the evaporator 25. The absorbed moisture is driven off by any suitable heating means, such as a gas burner 26, automatically controlled by a valve 27 actuated by a thermostat 28 in the evaporator. The thermostat 28 maintains the solution in the evaporator 25 at a substantially constant temperature which corresponds, at the pressure selected, to the desired concentration for the solution. If the evaporator is maintained at atmospheric pressure, or substantially atmospheric pressure, the temperature so selected corresponds to the atmospheric boiling point of the correctly concentrated hygroscopic medium selected.

From the evaporator 25, the concentrated solution flows, under the impulse of pump 29, through the interchanger 23 and from thence through an interchanger 30 and to the spray head 17. The interchanger 30 imparts to the hygroscopic medium substantially the wet bulb temperature of the outside atmosphere since the cooling medium therein is maintained at this temperature in a manner to be more fully described. In addition, the contacting zone 16 may itself be maintained at substantially the wet bulb temperature of the outside atmosphere by means of a cooling bank of pipes 31 through which a cooling medium flows from the pipe 32 and leaves through the pipe 33.

The cooling medium for the hygroscopic medium and for the zone 16 preferably is water maintained at the wet bulb temperatures of the outside temperature. This is accomplished by circulating water from the sump 33a by means of the pump 34 to the spray head 35 and also through the pipe 36 to the interchanger 30 and to the bank of pipes 31. The heated water from the interchanger 30 and the bank of pipes 31 flows through the pipe 37 to the spray head 38. Air from the outside atmosphere is brought into contact with the liquid sprayed from the heads 35 and 38. This is accomplished by causing a stream of air to flow through contact zone 39 by means of a blower 40. The zone 39 is connected by an air intake 41 and by an air discharge 42 with the outside atmosphere. The volume of air circulated through the zone 39 is made sufficient to impart its wet bulb temperature to the water.

The conditioning operation is automatically governed in accordance with conditions in the enclosure 14. Thus means 15 controls the flow of electric current to a starting relay 43 which in turn controls the starting and stopping of motors 44 and 45 which actuate the blowers 21 and 40 and the pumps 29 and 34 and 46, as diagrammatically indicated in Fig. 2.

If desired, the air, after passing through the zone 16, is brought in contact with water maintained at the new wet bulb temperature which has been imparted to the air. Thus the sump 47, which receives water from the eliminators 20 discharges into the pump 46 which in turn feeds the spray head 19. When water is thus circulated constantly in contact with air, it quickly attains the wet bulb temperature of the air, and thus tends to lower its temperature.

The hygroscopic medium used may be any desirable medium, such as ethylene glycol, diethylene glycol, glycerine, calcium chloride brine, or the water solution of the lithium halide-like salts, such as lithium chloride, iodide, bromide or other lithium salts having suitable water vapor pressure characteristics.

Make up water may be fed to the sumps 33a and 47 by the float valves 48 and 49 respectively which are connected to any source of water supply such as the city main.

While the form of embodiment of the invention as herein disclosed, constitutes a preferred form, it is to be understood that other forms might be adopted, all coming within the scope of the claim which follows.

What is claimed is as follows:

The method of conditioning air for an enclosure which comprises flowing a stream of said air into a conditioning chamber, cooling said air to the wet bulb temperature of the outside air by heat exchange with a cooling medium, independently circulating a stream of hygroscopic liquid to and from said stream of air as said air is being cooled, thereafter reducing the sensible heat of said air without changing the total heat of said air, and controlling the reduction in the sensible heat in accordance with humidity conditions in said enclosure.

HARRY F. SMITH.